J. C. LIGHTHOUSE.
SECTIONAL WHEEL TIRE.
APPLICATION FILED NOV. 18, 1908.

969,889.

Patented Sept. 13, 1910.

WITNESSES:
L. Thon
C. W. Carroll

INVENTOR:
John C. Lighthouse
by Osgood & Davis
his Attys

UNITED STATES PATENT OFFICE.

JOHN C. LIGHTHOUSE, OF ROCHESTER, NEW YORK.

SECTIONAL WHEEL-TIRE.

969,889.  Specification of Letters Patent.  Patented Sept. 13, 1910.

Application filed November 18, 1908. Serial No. 463,297.

*To all whom it may concern:*

Be it known that I, JOHN C. LIGHTHOUSE, a citizen of the United States, and resident of Rochester, in the county of Monroe and State of New York, have invented certain new and useful Improvements in Sectional Wheel-Tires, of which the following is a specification.

This invention relates to sectional wheel tires, and consists in the apparatus hereinafter described and claimed. The object of the invention is to provide a wheel tire having a tread portion consisting of compressible material, such as india rubber, leather or wood, divided into tread blocks, which tread blocks are held in block holders fastened on the felly of the wheel, and having provision for removal of the individual tread blocks for repair or replacement.

Figure 1:
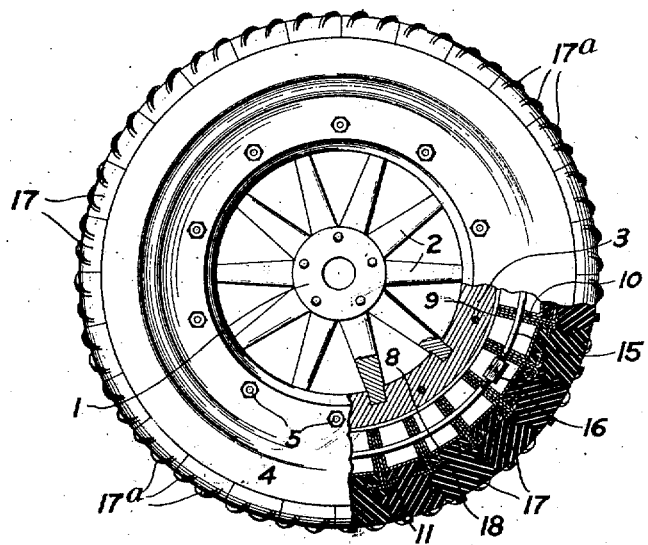
Figure 2:
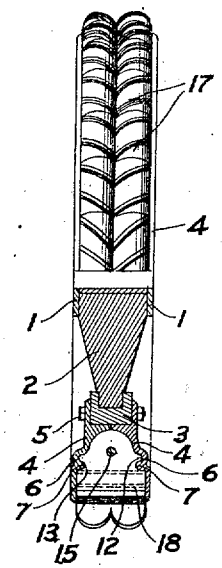
Figure 3:
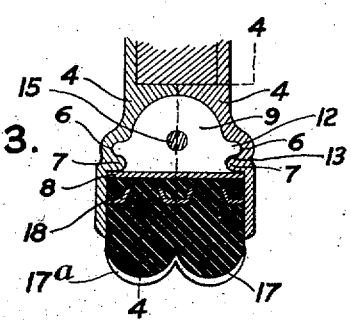
Figure 4:
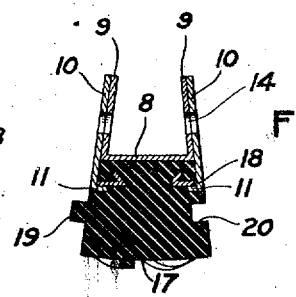
Figures 5, 6:
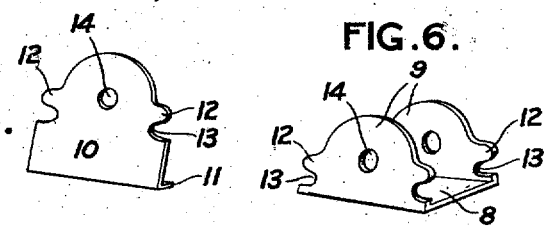
Figure 7:

In the drawings:—Figure 1 is a side elevation of a wheel embodying this invention, parts being broken away to exhibit interior construction; Fig. 2 is an end elevation of the same wheel, in which parts are also broken away to show the arrangement; Fig. 3 is an enlarged section through the center of a tire block, its holder and the contiguous parts upon a wheel; Fig. 4 is a vertical section on the line 4—4 of Fig. 3; Fig. 5 is a perspective view of one of the end plates of a tire block holder; Fig. 6 is a perspective view of one of the bottom plates of a tread block holder; and Fig. 7 is a perspective view of one of the plates set in a tread block.

In the drawings the invention is illustrated as applied to a wheel having a hub 1, a series of spokes 2, and a felly 3. On each side of the felly is a side plate 4, and the two side plates are held on the felly by bolts 5, passing through both side plates and the felly. The side plates are made of such form as to hold therein a series of tire sections under some pressure, so as to prevent lateral movement thereof on the felly, and for this purpose each side plate has on its inner surface a circumferential groove 6 and a circumferential rib or projection 7. When the side plates are in position on the wheel, as shown particularly in Fig. 3, they form a groove or channel for the tire sections, and the tire sections are so formed as to bottom in said groove, in order that the road pressure may be transmitted directly to the hub and axle of the wheel.

In the circumferential groove between the side plates are fitted a series of tread block holders, each consisting of a bottom plate 8, having end flanges 9 turned up therefrom. Outside of the flanges 9 are end portions 10, having preferably contours registering with those of the flanges 9, and having inwardly turned edges 11 for a purpose to be described.

The contours of the flanges 9 and of the end plates 10 are such as to bottom in the groove above mentioned between the side plates 4, and to fit by a projection 12 and a notch or depression 13 the corresponding groove 6 and rib or projection 7 in each of the side plates, so that when the side plates are firmly clamped on the felly by the bolts 5, the holders will be firmly locked in place. Through the side plates 10 and flanges 9 are perforations 14, whereby the holders may be pivoted upon a ring 15 set concentric to the felly 3. This ring is capable of being loosened and tightened in any suitable way, as by a right-and-left hand nut 16 fitting on corresponding threads on the ends of the ring. Upon turning the nut, the ring may be so contracted and tightened that all the tread-block holders are firmly clamped in the bottom of the groove between the side plates.

Tread blocks 17 are provided, in each of which is embedded a plate 18 having its edges flush with the end surfaces of the block, so that the inwardly turned edges or hooks 11 of the end-plates 10 may engage the outer surface of the plate 18, and when the tire sections are locked in position by the ring 15 and the side plates, the hooks 11 draw the plate 18 toward the center of the wheel, and thus clamp the tread block firmly between the end plate 10 and against the bottom plate 8. The opposite ends of the tread block 17 are provided with transverse tongues 19 and grooves 20, so that when all the parts are in place the tongues and grooves of the adjacent tread blocks will intermesh and tend to lock all the parts together, and to prevent passage of dirt, sand, &c., toward the interior of the apparatus.

It will be noted that the inwardly turned edges or hooks 11 are arranged transversely to the circumference of the wheel, and it will be clear that upon removal of one of the side plates 4, and the loosening of the ring 15, any tread block 17 may be slid out from under the hooks 11, and be replaced by another, if desired, or the same block may be inserted again. The lines of the tongues and grooves 19 and 20 are parallel to the line of movement necessary for the removal just mentioned.

It is preferable to make the outer portions of the tread blocks slightly longer than the space they are ultimately to fill, in order that when the ring 15 is contracted, and the side plates 4 are bolted in place, the material of which the tread blocks are formed shall be compressed, and thus produce a better resisting tire. The faces of the blocks that strike the ground may be provided with lugs or projections, in order to present a greater and more irregular gripping surface thereto. Said projections in the present instance are shown as ribs 17$^a$ that extend at an angle to the circumference of the wheel and to each other.

What I claim is:—

1. A wheel; side plates projecting peripherally therefrom and forming a peripheral groove and removable on one side; tread block holders in said groove each holder having hooked end portions; tread blocks in said holders having rigid plates embedded therein provided with edges adapted to be engaged by said hooked portions; and means for drawing said hooked end portions and the tread blocks toward the center of the wheel.

2. A wheel; side plates projecting peripherally therefrom and forming a peripheral groove and removable on one side; perforated tread block holders in said groove each holder having hooked end portions; tread blocks in said holders having rigid plates embedded therein provided with edges adapted to be engaged by said hooked portions; and an expanding and contracting ring passing through the perforations of the holders for drawing the hooked portions and the tread blocks toward the center of the wheel.

3. A wheel; side plates projecting peripherally therefrom and forming a peripheral groove and removable on one side; tread block holders in said groove each holder having hooked end portions; tread blocks in said holders having rigid plates embedded therein provided with edges adapted to be engaged by said hooked portions; and interlocking means between the side plates and the tread block holders.

4. A wheel; side plates projecting peripherally therefrom and forming a peripheral groove and removable on one side; perforated tread block holders in said groove each holder having hooked end portions; tread blocks in said holders having rigid plates embedded therein provided with edges adapted to be engaged by said hooked portions; an expanding and contracting ring passing through the perforations of the holders for drawing the hooked portions and the tread blocks toward the center of the wheel; and interlocking means between the side plates and the tread block holders.

5. A wheel; side plates projecting peripherally therefrom and forming a peripheral groove and removable on one side; tread block holders in said groove each holder consisting of hooked end plates and a bottom plate between said end plates; tread blocks in said holders having rigid plates embedded therein and adapted to slide transversely under said hooked end plates; and means for drawing said hooked plates and bottom plates toward the center of the wheel.

6. A wheel; side plates projecting peripherally therefrom and forming a peripheral groove and removable on one side; perforated tread block holders in said groove each holder consisting of hooked end plates and a bottom plate between said end plates; tread blocks on said holders having rigid plates embedded therein and adapted to slide transversely under said hooked end plates; and an expanding and contracting ring passing through the perforations of the holders for drawing the hooked plates and bottom plates toward the center of the wheel.

7. A wheel; side plates projecting peripherally therefrom and forming a peripheral groove and removable on one side; tread block holders in said groove each holder consisting of hooked end plates and a bottom plate between said end plates; tread blocks in said holders having rigid plates embedded therein and adapted to slide transversely under said hooked end plates; and interlocking means between the side plates and the tread block holders.

8. A wheel; side plates projecting peripherally therefrom and forming a peripheral groove and removable on one side; perforated tread block holders in said groove each holder consisting of hooked end plates and a bottom plate between said end plate; tread blocks in said holders having rigid plates embedded therein and adapted to slide transversely under said hooked end plates; an expanding and contracting ring passing through the perforations of the holders for drawing the hooked plates and bottom plates toward the center of the wheel; and interlocking means between the side plates and the tread block holders.

9. A wheel; tread-block holders each having hooked end portions, tread blocks in said holders having rigid plates embedded therein provided with edges adapted to be engaged by said hooked portions, and means for securing the tread-block holders upon the periphery of the wheel and preventing lateral movement of the tread-blocks in said holders.

JOHN C. LIGHTHOUSE.

Witnesses:
 ELIZABETH F. LIGHTHOUSE,
 D. GURNEE.